US012262179B1

(12) United States Patent
Olah

(10) Patent No.: US 12,262,179 B1
(45) **Date of Patent: *Mar. 25, 2025**

(54) AUDIOGRAM, SYSTEM FOR AIDING HEARING, AND METHOD FOR USE OF SAME

(71) Applicant: Laslo Olah, Richardson, TX (US)

(72) Inventor: Laslo Olah, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,796

(22) Filed: Jul. 22, 2024

Related U.S. Application Data

(63) Continuation-in-part of application No. 18/634,077, filed on Apr. 12, 2024, now Pat. No. 12,108,220.
(Continued)

(51) Int. Cl.
*H04R 25/00* (2006.01)

(52) U.S. Cl.
CPC ........... *H04R 25/50* (2013.01); *H04R 25/305* (2013.01); *H04R 25/558* (2013.01); *H04R 25/609* (2019.05); *H04R 25/70* (2013.01)

(58) Field of Classification Search
CPC .... H04R 25/558; H04R 25/609; H04R 25/40; H04R 25/505; H04R 25/554;
(Continued)

(56) References Cited

U.S. PATENT DOCUMENTS 5,987,147 A 11/1999 Nishimoto
7,113,589 B2 9/2006 Mitchler
(Continued)

FOREIGN PATENT DOCUMENTS

KR 20170026786 3/2017
WO 2016188270 12/2016
WO 2019136382 7/2019

OTHER PUBLICATIONS

International Preliminary Report on Patentability dated Jul. 7, 2020 regarding International Application No. PCT/US2019/012550; 8 pp.
(Continued)

*Primary Examiner* — Phylesha Dabney

(74) *Attorney, Agent, or Firm* — Scott Griggs; Griggs Bergen LLP

(57) ABSTRACT

An audiogram, a system for aiding hearing and a method for use of the same are disclosed. In one embodiment, a hearing aid device equipped with sound processing capabilities, including a microphone, speaker, and electronic signal processor wirelessly communicates with a smart device. The electronic signal processor is adaptable based on a custom audiogram-vivo adaptare audiogram-stored at the hearing aid device, which can be dynamically adjusted through a smart device application. Patients can directly influence their hearing experience by modifying the vivo adaptare audiogram via the app, adjusting settings like sound level, directional microphone activation, and noise cancellation levels. This allows users to tailor hearing aid settings to the immediate environment and personal hearing needs, ensuring an optimized auditory experience. The system emphasizes user control and adaptability, offering a significant advancement in hearing aid technology.

20 Claims, 12 Drawing Sheets

Related U.S. Application Data

(60) Provisional application No. 63/632,371, filed on Apr. 10, 2024, provisional application No. 63/564,110, filed on Mar. 12, 2024.

(58) Field of Classification Search
CPC .............. H04R 25/604; H04R 2225/55; H04R 2225/43; H04R 2430/01
USPC .......................................................... 381/314
See application file for complete search history.

(56) References Cited

U.S. PATENT DOCUMENTS

| | | | | |
|---|---|---|---|---|
| 8,565,460 | B2 | 10/2013 | Takagi et al. | |
| 8,761,421 | B2 | 6/2014 | Apfel | |
| 9,232,322 | B2 | 1/2016 | Fang | |
| 9,344,814 | B2 | 5/2016 | Rasmussen | |
| 9,497,530 | B1 * | 11/2016 | Campbell | H04R 1/1091 |
| 9,712,928 | B2 | 7/2017 | Pedersen et al. | |
| 10,181,328 | B2 | 1/2019 | Jensen et al. | |
| 2005/0004691 | A1 | 1/2005 | Edwards | |
| 2005/0245221 | A1 | 11/2005 | Beyer | |
| 2008/0004691 | A1 | 1/2008 | Weber | |
| 2012/0106762 | A1 | 5/2012 | Kornagel | |
| 2012/0121102 | A1 | 5/2012 | Jang | |
| 2013/0142369 | A1 | 6/2013 | Zhang et al. | |
| 2013/0223661 | A1 | 8/2013 | Uzuanis | |
| 2016/0338622 | A1 | 11/2016 | Chen | |
| 2018/0035216 | A1 | 2/2018 | Van Hasselt et al. | |
| 2018/0207167 | A1 | 7/2018 | Dyhrfjeld-Johnsen | |
| 2020/0268260 | A1 | 8/2020 | Tran | |
| 2021/0006909 | A1 | 1/2021 | Olah et al. | |

OTHER PUBLICATIONS

International Search Report and Written Opinion dated Mar. 22, 2019 regarding International Application No. PCT/US2019/012550; 10 pp.

International Search Report and Written Opinion dated Aug. 5, 2021 concerning International Application No. PCT/US2021/029414; 8 pp.

* cited by examiner

AUDIOGRAM, SYSTEM FOR AIDING HEARING, AND METHOD FOR USE OF SAME

PRIORITY STATEMENT & CROSS-REFERENCE TO RELATED APPLICATIONS

This application is a continuation-in-part of U.S. Non-provisional patent application Ser. No. 18/634,077 entitled "System for Aiding Hearing and Method for Use of Same" and filed on Apr. 12, 2024 in the name of Laslo Olah; which claims priority from the following applications: (1) United States Provisional Patent Application Ser. No. 63/564,110 entitled "System for Aiding Hearing and Method for Use of Same" and filed on Mar. 12, 2024 in the name of Laslo Olah; and (2) United States Provisional Patent Application Ser. No. 63/632,371 entitled "System for Aiding Hearing and Method for Use of Same" and filed on Apr. 10, 2024 in the name of Laslo Olah; all of which are hereby incorporated by reference, in entirety, for all purposes.

TECHNICAL FIELD OF THE INVENTION

This invention relates, in general, to hearing tests and systems for aiding hearing and, in particular, to audiograms, systems for aiding hearing, hearing aid devices, and methods for use of the same that provide hearing testing as well as signal processing and feature sets to enhance speech and sound intelligibility.

BACKGROUND OF THE INVENTION

Traditionally, the management of hearing loss has been anchored in a process that confines the crucial step of audiogram assessment and fitting within specialized test facilities. This conventional approach necessitates that individuals seeking hearing testing, hearing improvements, or hearing aid adjustments must physically visit these facilities to undergo testing, followed by the fitting of the hearing aid according to the newly assessed audiogram. In the event of any changes in the patient's hearing capabilities or dissatisfaction with the hearing aid's performance, the cycle necessitates a return to the test facility for reassessment. This process not only imposes significant logistical challenges but also delays the optimization of hearing aid settings to accommodate evolving patient needs. Hence, there is a burgeoning need for innovative hearing aids and methodologies that transcend these traditional constraints, offering patients the flexibility to tailor their hearing experience directly, without the repeated need to revert to test facilities for adjustments.

SUMMARY OF THE INVENTION

This application introduces a transformative approach to existing in-situ hearing aid technology, fundamentally redefining the audiogram's role and the concept of hearing testing. While traditional in-situ systems modify various parameters based on a static test audiogram that can only be adjusted in a test lab, a vivo adaptare system introduced herein dynamically modifies the audiogram itself. This eliminates the need for repeated visits to test facilities and allows for real-time, user-driven customization. Unlike traditional hearing care systems, where audiograms are generated and stored at test facilities, requiring patients to visit for testing, fitting, and subsequent adjustments, this embodiment of innovation embeds the audiogram directly within the hearing aid itself and enables real-time, user-driven audiogram adjustments via a smart device, for example, effectively making the journey to test facilities for adjustments obsolete. "Testing" is reinterpreted to mean generating an up-to-the-moment audiogram through the user's smart device, allowing for immediate customization of the hearing aid's settings based on current environmental needs and personal hearing preferences. For example, a user troubled by excessive high-frequency sounds can instantly adjust the amplification settings in specific frequency range through their smart device and upload the new audiogram directly to their hearing aid, bypassing traditional processes and devices.

An audiogram, a system for aiding hearing and a method for use of the same are disclosed. In one embodiment, a hearing aid device equipped with sound processing capabilities, including a microphone, speaker, and electronic signal processor wirelessly communicates with a smart device. The electronic signal processor is adaptable based on a custom audiogram-vivo adaptare audiogram-stored at the hearing aid device, which can be dynamically adjusted through a smart device application. Patients can directly influence their hearing experience by modifying the vivo adaptare audiogram via the app, adjusting settings like sound level, directional microphone activation, and noise cancellation levels. This allows users to tailor hearing aid settings to the immediate environment and personal hearing needs, ensuring an optimized auditory experience. The system emphasizes user control and adaptability, offering a significant advancement in hearing aid technology.

This innovation extends to the smart device conducting actual hearing tests by playing harmonics, for example, seamlessly with the hearing aid to refine the audiogram. This direct integration challenges existing in-situ hearing aids and the conventional reliance on external test facilities and real-time communication between smart devices and hearing aids, which is hampered by time delays. Further, systems and methodology are presented for dissecting the frequency range into distinct frequency segments and managing each as an independent entity. This approach enhances the precision and customization of the hearing aid.

A key innovation of this system lies in its fundamental departure from traditional hearing aid technology, which operates on a fixed audiogram that cannot be altered. Conventional hearing aids make adjustments on top of this static audiogram, limiting the ability to tailor the hearing experience dynamically. In contrast, the approach presented herein allows for the audiogram itself to be changed and customized in real-time. This is achieved by storing multiple audiograms on a smart device, including initial and modified versions. The hearing aid operates based on the most recent audiogram, which can be dynamically adjusted and uploaded directly from the smart device. This "about to be uploaded" audiogram can either be a modification of the current one or a previously stored audiogram that the user recalls from memory and uploads after making any desired adjustments. This capability provides unparalleled flexibility and personalization, enabling users to continuously optimize their hearing experience based on their immediate auditory environment and personal preferences. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
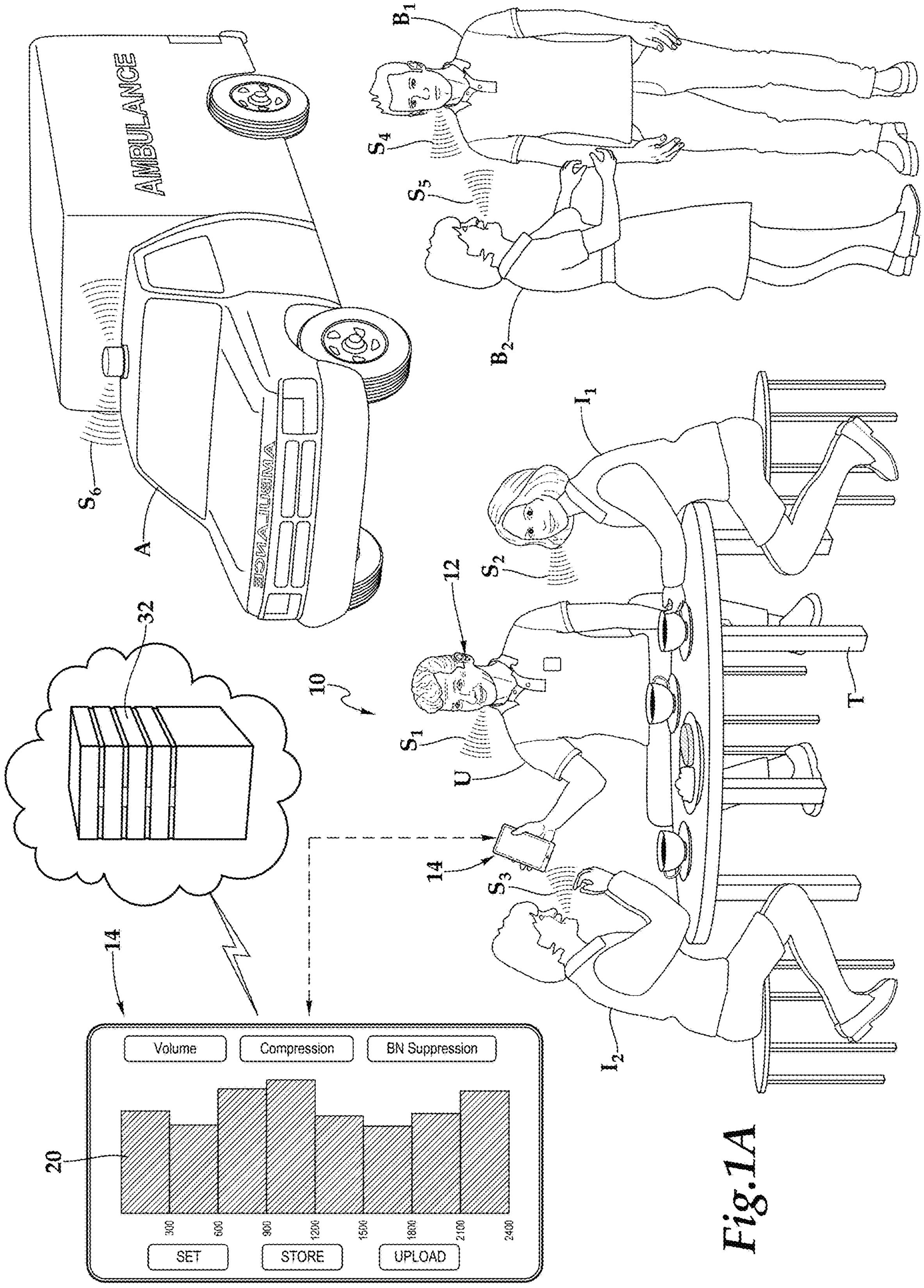
FIG. 1A is a front perspective schematic diagram depicting one embodiment of a hearing aid device being utilized according to the teachings presented herein.
Figure 1B:
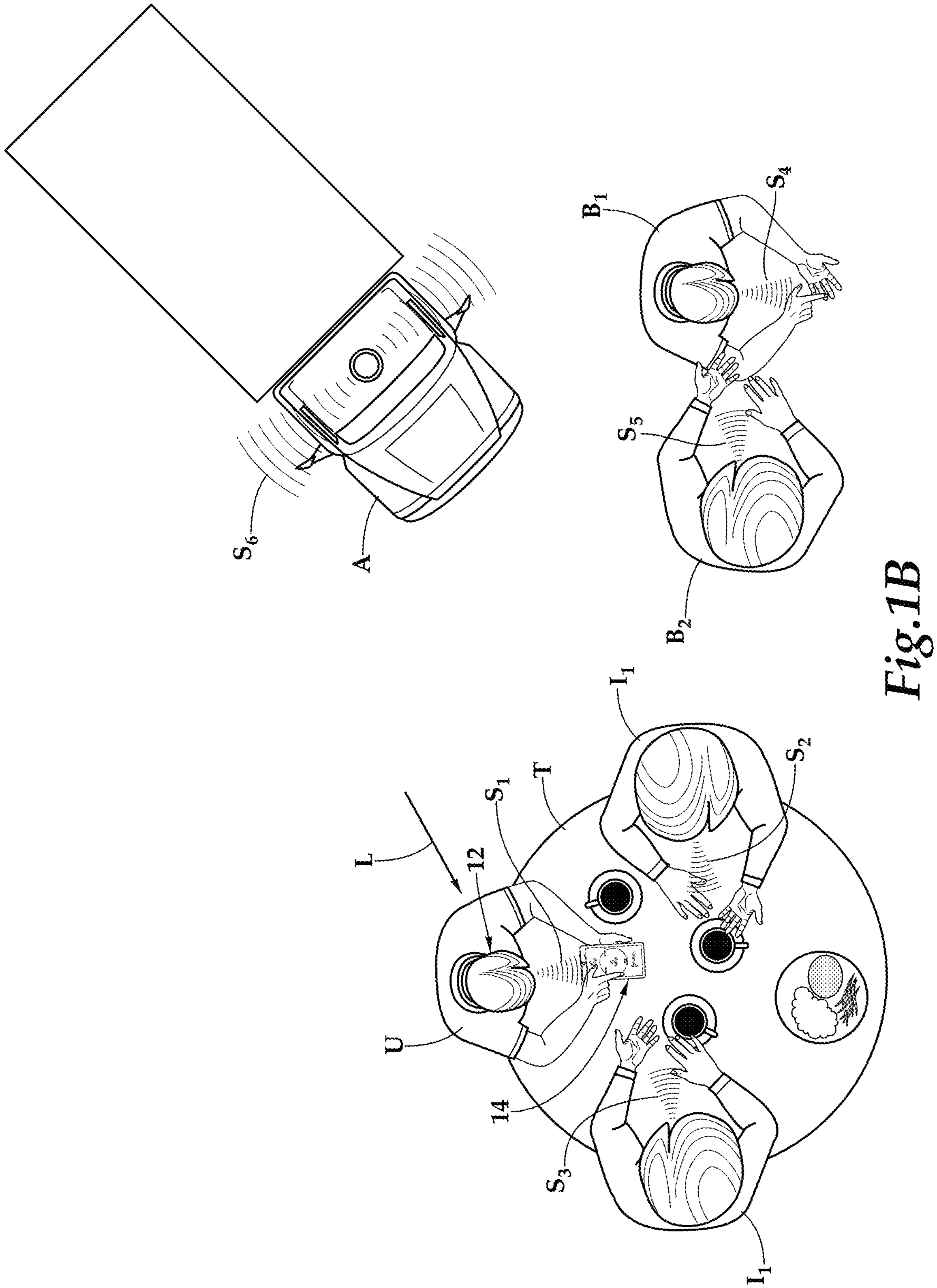
FIG. 1B is a top plan view depicting the hearing aid device of FIG. 1A being utilized according to the teachings presented herei FIGS. 2A, 2B, and 2C, collectively, are graphical representations of audiogram processing according to the teachings presented herein.

Referring initially to FIG. 1A and FIG. 1B, therein is depicted one embodiment of a system for aiding hearing, which is schematically illustrated and designated 10. As shown, a user U, who may be considered a patient requiring a hearing aid, is wearing a hearing aid device 12 and sitting at a table T at a restaurant or café, for example, and engaged in a conversation with an individual $I_1$ and an individual $I_2$. As part of a conversation at the table T, the user U is speaking sound $S_1$, the individual $I_1$ is speaking sound $S_2$, and the individual $I_2$ is speaking sound $S_3$. Nearby, in the background, a bystander $B_1$ is engaged in a conversation with a bystander $B_2$. The bystander $B_1$ is speaking sound $S_4$ and the bystander $B_2$ is speaking sound $S_5$. An ambulance A is driving by the table T and emitting sound $S_6$. The sounds $S_1$, $S_2$, and $S_3$ may be described as the immediate background sounds. The sounds $S_4$, $S_5$, and $S_6$ may be described as the background sounds. The sound $S_6$ may be described as the dominant sound as it is the loudest sound at table T. By way of example, the ambulance A and the sound Se are originating on the left side of the user U and the sound is appropriately distributed at the hearing aid 10 to reflect this occurrence as indicated by an arrow L.

In some embodiments, the hearing aid device 12, which may be a hearing aid, earbuds, or headphones, for example, seamlessly integrates with a proximate smart device 14—such as a smartphone, smartwatch, tablet computer, or wearable. This integration is facilitated through a user-friendly interface displayed on the smart device 14, which hosts a range of intuitive controls including volume adjustments, operational mode selections, and real-time audiogram customization features. By real-time modifying the audiogram, the user can effortlessly transmit control signals wirelessly from the smart device 14 to the hearing aid device 12. This allows for immediate changes to volume or sound level, operational modes such as directional sound focus, noise cancellation levels, and other settings based on the dynamically updated audiogram. This direct interaction heralds a significant shift towards user-empowered hearing aid management, enabling on-the-spot modifications tailored to the user's specific auditory environment and personal preferences by continuously adapting the audiogram in real time. Central to this system is a programming interface that establishes a dynamic communication channel between the hearing aid device 12 and the smart device 14. This bidirectional interface supports the direct adjustment and real-time customization of the hearing aid's settings via an application on the smart device 14. The application empowers users to actively manage and fine-tune their hearing experience, from adjusting an audiogram 20 that may be stored on the hearing aid device 12 and displayed on the smart device 14, to selecting specific sound processing features. This level of customization and control directly from the user's smart device is unprecedented, moving beyond the traditional confines of hearing aid management and setting a new standard for personal auditory assistance. Further, this programming interface is an extensible architecture configured to integrate additional operational modes and functionalities beyond those described, wherein the architecture enables the seamless addition of features and enhancements derived from future scientific achievements, thereby allowing for continuous improvement and expansion of the system's capabilities in response to evolving user needs and technological advances.

Furthermore, this system addresses the concept of auditory testing and audiogram customization. Utilizing the smart device application, users can conduct on-demand auditory tests, thereby transforming any location into a potential test environment. This capability enables users to create and adjust their audiograms in real time, based on immediate hearing assessments and environmental conditions. This approach stands in stark contrast to conventional methods reliant on static, infrequently updated audiograms and limited adaptability. By placing the power of audiogram customization and auditory testing directly in the hands of the user, the system offers unparalleled flexibility and personalization in hearing aid technology, marking a significant leap forward from existing practices.

As alluded, the hearing aid device 12 may be a vivo adaptare device—adapting to the living within the living—that incorporates the functionality to not only assist hearing but also to conduct auditory tests directly within the user's ear, where the hearing aid device 12 is situated. This means the hearing aid can generate, adjust, and apply audiograms—personalized hearing profiles based on the user's specific hearing capabilities and environmental conditions— without the need to remove the device or visit a professional audiologist for testing in a separate facility. Unlike traditional in-situ systems where the audiogram is fixed and only parameters can be adjusted, the vivo adaptare system presented herein allows for the audiogram itself to be modified. This fundamental shift enables users to continuously update their hearing profile based on real-time assessments and personal preferences, without needing a test lab.

With this arrangement, the systems and methods presented herein allow the hearing aid to assess hearing capabilities in the actual environment—dynamically—where the user listens, providing more accurate and personalized results than traditional, clinic-based audiograms. Unlike traditional hearing aids, which are programmed using audiograms obtained from clinical tests, this vivo adaptare hearing aid embodiment can generate and update audiograms automatically. This process may involve playing a series of harmonic tones directly into the ear through the hearing aid and measuring the user's responses to these sounds, effectively mapping out the user's hearing profile in real-time. Once the audiogram is generated or updated, the hearing aid device 12 can immediately adjust its settings to match the user's current hearing needs. This dynamic approach allows users to have their hearing aids adjusted for optimal performance across different listening environments, such as moving from a quiet room to a noisy outdoor setting.

Figure 2A:
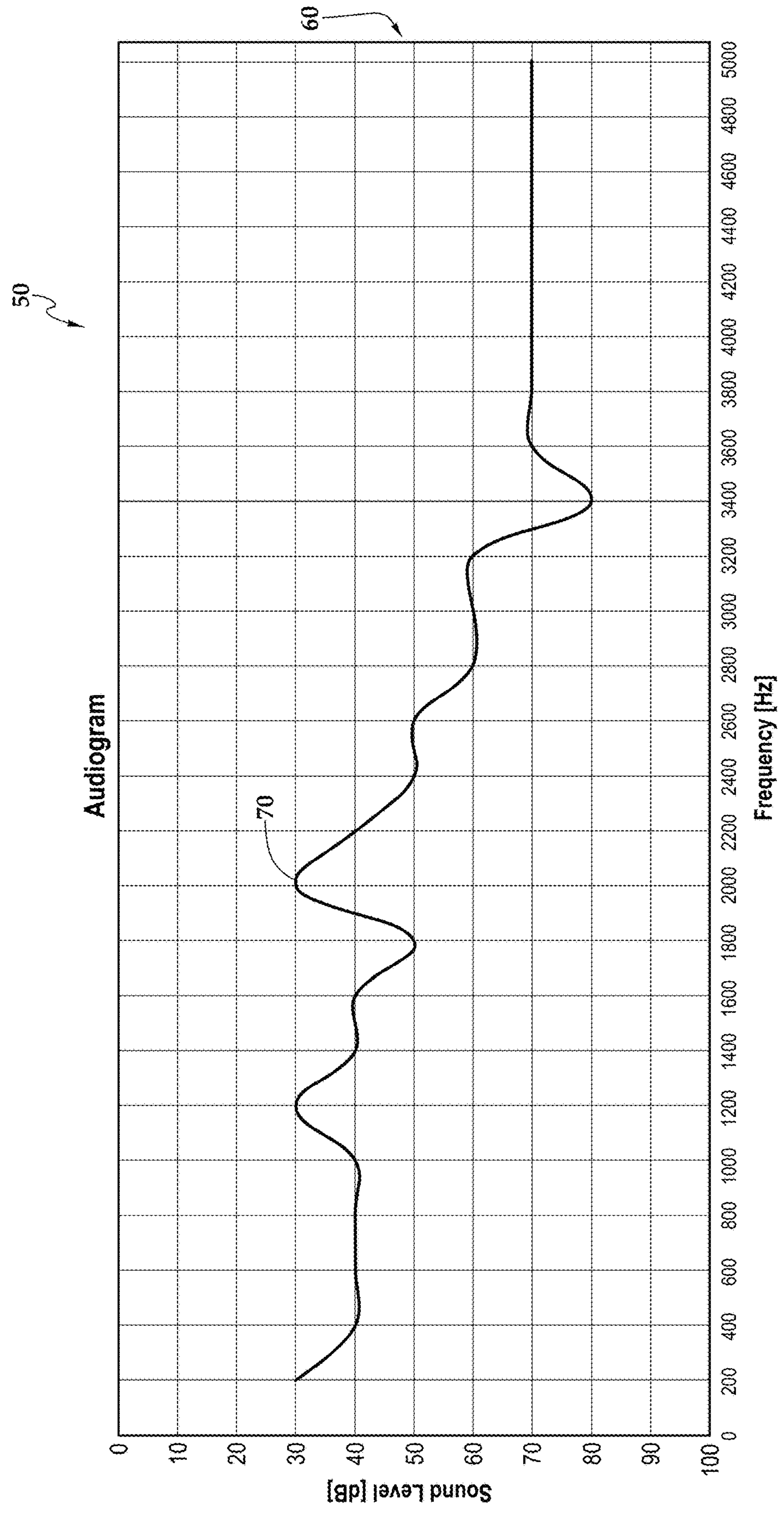
Figure 2B:
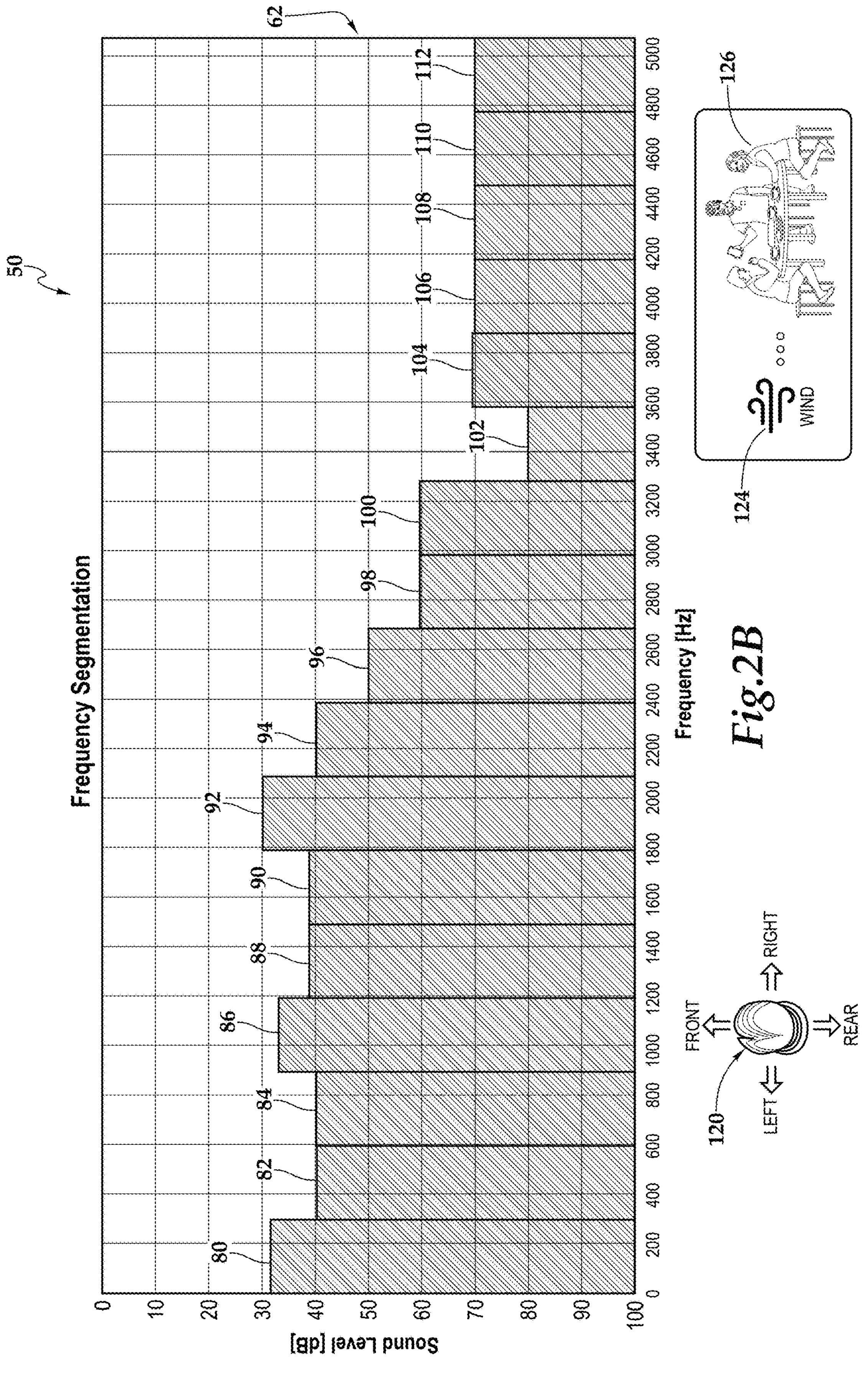
Figure 2C:
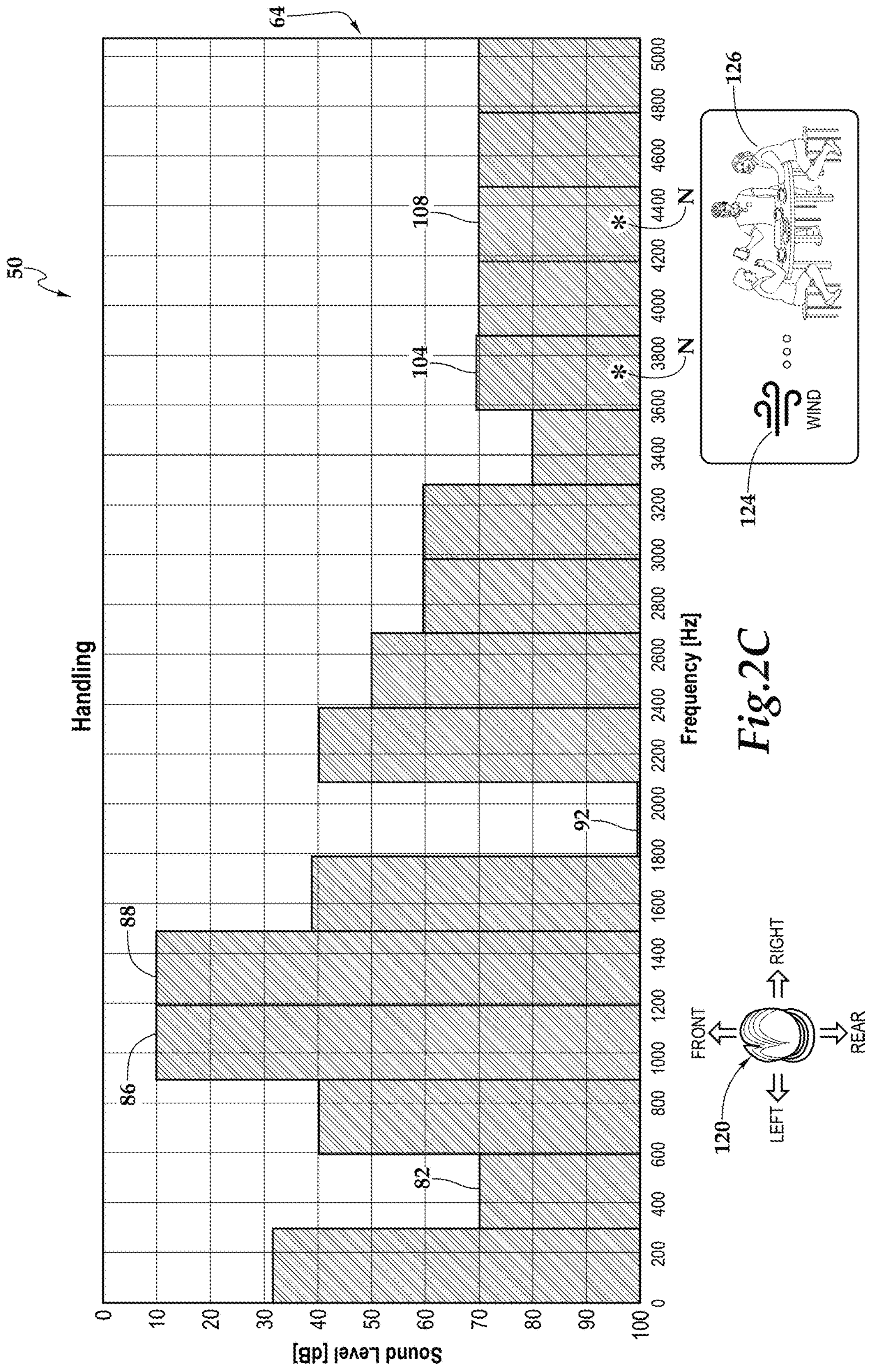

Referring now to FIGS. 2A, 2B, and 2C, audiogram processing 50 according to some embodiments is illustrated with audiogram 60, frequency segmented audiogram 62, and vivo adaptare audiogram 64. Initially, the audiogram 60 represents the user's baseline hearing profile, capturing the range of frequencies and corresponding hearing levels with a baseline 70 shown graphed against frequency expressed in Hertz (Hz) on the x-axis and sound level expressed in decibels (dB) on the y-axis. The audiogram 60 is then segmented into distinct frequency ranges, forming the frequency segmented audiogram 62. As shown, seventeen frequency segments 80, 82, 84, 86, 88, 90, 92, 94, 96, 98, 100, 102, 104, 106, 108, 110, 112 are created. It should be appreciated, however, that any number of frequency segments may be created and frequency segments may be combined or divided as needed. Also, if needed, the frequency segments 80-112 may have different varying widths. Each segment 80-112 corresponds to a specific frequency range, allowing for precise and individualized adjustments. Additionally, in some embodiments, the frequency segmented audiogram 62 is enhanced with a directional sound feature 120, which manages directional-based sound intervention such as front, left, right, and rear, and an environmental feature 122, which includes adaptations for conditions such as wind settings 124 and urban settings 126, for example. These features provide a comprehensive and adaptive hearing experience tailored to the user's immediate auditory environment and personal preferences.

The final step, represented by a vivo adaptare audiogram 64, involves the dynamic customization of these segments in real-time based on user inputs and environmental conditions. The smart device 14 facilitates this process by enabling the user to modify the segmented audiogram directly through an intuitive interface. Adjustments are wirelessly transmitted to the hearing aid device 12, which then updates its settings to reflect the customized audiogram. This process, denoted as vivo adaptare, allows for continuous and adaptive optimization of the user's hearing experience, ensuring personalized auditory enhancement tailored to real-time needs.

Examples of the type of customization that may occur during the vivo adaptare process with the vivo adaptare audiogram 64 include reducing the sound level in decibels (dB) of specific frequency segments, as shown in FIG. 2C at frequency segment 82; increasing the sound level in decibels (dB) of specific frequency segments, as shown in FIG. 2C at frequency segments 86, 88. Further changes to the vivo adaptare audiogram 64 using the vivo adaptare process include muting sound at frequency segment 92.

The vivo adaptare process offers several additional features, enhancing the overall hearing experience. For instance, it can indicate frequency segments in use, as shown by element N, to assist the patient in locating a frequency segment which may need modification. The vivo adaptare process may reduce amplification in specific frequency bands to improve speech clarity in noisy environments like crowded restaurants by utilizing the urban settings 126 of the environmental feature 122. It customizes the vivo adaptare audiogram 64 to amplify higher frequencies for users with high-frequency hearing loss, making sounds like birds chirping or consonants in speech more audible. Additionally, the vivo adaptare audiogram 64 in the hearing aid device 12 may be adjusted to emphasize sounds from specific directions using the directional sound feature 120, ideal for situations like lectures or conversations in noisy places by reducing background noise from other directions. The hearing aid settings can also be further customized based on the environment; for example, in windy outdoor settings, it reduces wind noise by adjusting frequencies associated with wind noise using the wind settings 124 of the urban settings 122, while in noisy urban environments, it minimizes city noise by adjusting frequencies associated with urban sounds. These examples illustrate how the vivo adaptare process provides a versatile and adaptive hearing experience tailored to the user's or patient's immediate auditory environment and personal preferences.

Figure 3:
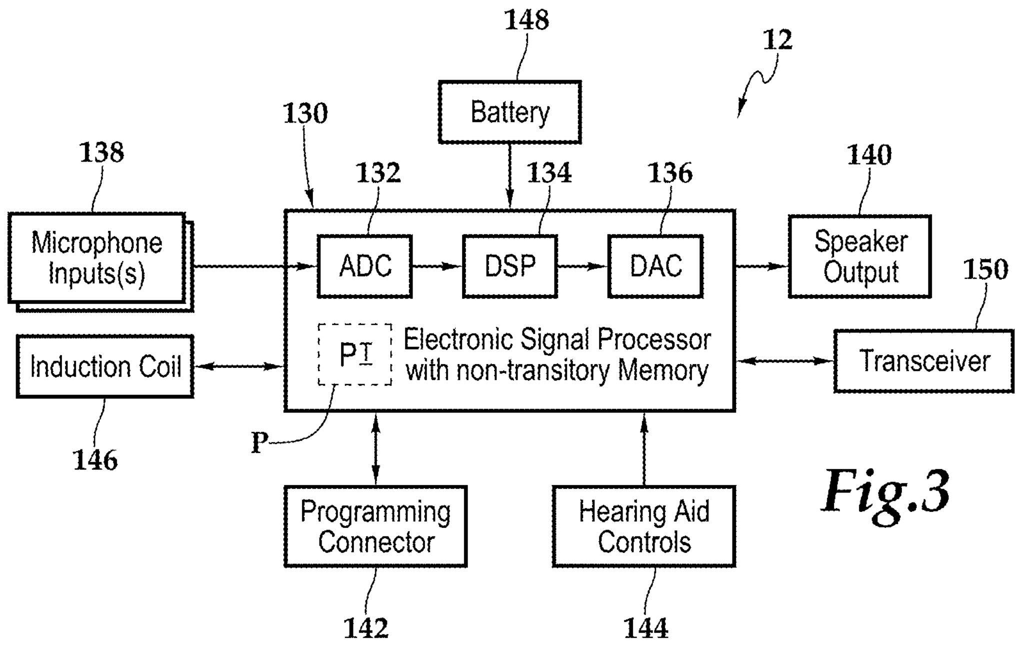
FIG. 3 is a functional block diagram depicting one embodiment of the hearing aid device shown herein.

Referring now to FIG. 3, an illustrative embodiment of the hearing aid device 12 is depicted. In one embodiment, an electronic signal processor 130 may be housed in the hearing aid device 12. The hearing aid 10 may include an electronic signal processor 130 for each ear or the electronic signal processor 130 for each ear may be at least partially integrated or fully integrated. In order to measure, filter, compress, and generate, for example, continuous real-world analog signals in form of sounds, the electronic signal processor 130 may include an analog-to-digital converter (ADC) 132, a digital signal processor (DSP) 134, and a digital-to-analog converter (DAC) 136. In some embodiments, the electronic signal processor 130, including the digital signal processor embodiment, has memory accessible to a processor as well as an interface to a programming interface P. One or more microphone inputs 138 corresponding to one or more respective microphones, a speaker output 140, various controls, such hearing aid controls 144, an induction coil 146, a battery 148, and a transceiver 150 are also housed within the hearing aid 10. An optional programming connector 142 serves as an interface between a hearing aid and a programming device, such as a computer or a dedicated hearing aid programming unit.

As shown, a signaling architecture communicatively interconnects the microphone inputs 138 to the electronic signal processor 130 and the electronic signal processor 130 to the speaker output 140. The various hearing aid controls 144, the induction coil 146, the battery 148, and the transceiver 150 are also communicatively interconnected to the electronic signal processor 130 by the signaling architecture. The speaker output 140 sends the sound output to a speaker or speakers to project sound and in particular, acoustic signals in the audio frequency band as processed by the hearing aid 10. The hearing aid controls 144 may include an ON/OFF switch as well as volume controls, for example. It should be appreciated, however, that in some embodiments, all control is manifested through the adjustment of the vivo adaptare audiogram. The induction coil 146 may receive magnetic field signals in the audio frequency band from a telephone receiver or a transmitting induction loop, for example, to provide a telecoil functionality. The induction coil 146 may also be utilized to receive remote control signals encoded on a transmitted or radiated electromagnetic carrier, with a frequency above the audio band. Various programming signals from a transmitter may also be received via the induction coil 146 or via the transceiver 150, as will be discussed. The battery 148 provides power to the hearing aid 10 and may be rechargeable or accessed through a battery compartment door (not shown), for example. The transceiver 150 may be internal, external, or a combination thereof to the housing. Further, the transceiver 150 may be a transmitter/receiver, receiver, or an antenna, for example. Communication between various smart devices and the hearing aid 10 may be enabled by a variety of wireless methodologies employed by the transceiver 150, including 802.11, 3G, 4G, Edge, WiFi, ZigBee, near field communications (NFC), Bluetooth low energy, and Bluetooth, for example.

The various controls and inputs and outputs presented above are exemplary and it should be appreciated that other types of controls may be incorporated in the hearing aid device 10. Moreover, the electronics and form of the hearing aid device 10 may vary. The hearing aid device 10 and associated electronics may include any type of headphone configuration, a behind-the-ear configuration, an in-the-ear configuration, or in-the-ear configuration, for example.

Referencing FIG. 3, the electronic signal processor 130 within the hearing aid is engineered to work with a dynamically customizable audiogram, allowing for personalization in hearing aid technology. This innovative approach permits the user U to adjust the audiogram in real-time via the smart device 14 to suit his or her unique hearing preferences and the specific demands of their auditory environment. The electronic signal processor 130, which is associated with the programming interface P, within the hearing aid device 12 allows for a range of adjustments to suit the user's individual hearing preferences and environmental needs.

In some embodiments of the system 10, the programming interface P establishes a dynamic and bidirectional communication channel between the hearing aid device 12 and the smart device 14. The programming interface P supports the direct adjustment and real-time customization of the hearing aid's settings via an application on the smart device 14. This interface enables users to actively manage and fine-tune their hearing experience by modifying the audiogram stored on the hearing aid device 12 through the smart device 14. The programming interface P ensures that any changes made to the audiogram are instantly communicated to the hearing aid, allowing for immediate application of the updated settings. This extensible architecture of the programming interface P also supports the integration of additional operational modes and functionalities, allowing for continuous improvement and expansion of the system's capabilities in response to evolving user needs and technological advances.

Furthermore, the system supports on-demand auditory testing via the smart device, a feature that empowers users to continuously refine their audiogram settings. By assessing their hearing capabilities and environmental conditions in real-time, users can achieve a more personalized and effective hearing aid performance, thereby significantly enhancing their quality of life. Further, in one embodiment, with respect to FIG. 3, the various controls 72 may include digital noise reduction, impulse noise reduction, and wind noise reduction may also be incorporated, for example. As alluded to, system compatibility features, such as FM compatibility and Bluetooth compatibility, may be included in the hearing aid device 12.

Inside the hearing aid device 12, the electronic signal processor 130 operates as a sophisticated computational unit, processing complex instructions stored within its memory. This memory, which can be either volatile for temporary data storage or non-volatile for long-term data retention, is crucial for the adaptive functionalities of the hearing aid. Upon execution of these instructions, the processor transforms input analog signals from the microphone into digital signals for advanced processing. This process includes an innovative step where the digital signal is adjusted based on a user-specific audiogram, incorporating a subjective assessment of sound quality. This unique feature allows the electronic signal processor 130 to personalize the audio output, tailoring it to the user's hearing profile by adjusting the signal to match the preferred hearing range identified in the audiogram. Consequently, the processor refines the digital signal into an optimized analog output, ready to be delivered to the user through the hearing aid's speaker. This end-to-end processing not only customizes sound based on individual preferences but also dynamically adapts to changing environmental conditions, significantly enhancing the auditory experience.

Further, the memory's processor-executable instructions extend the hearing aid's capabilities, enabling it to respond to various control signals for volume adjustment and mode selection. In some embodiments, the processor-executable instructions cause the system to receive, through the user interface, patient inputs for adjusting a decibel level of a portion of the plurality of frequency segments, and process the patient inputs to adjust the vivo adaptare audiogram, thereby enabling adaptation to varying auditory environments as perceived by the patient. The instructions may increase the decibel level for one or more of the frequency segments based on the patient inputs, decrease the decibel level for one or more of the plurality of frequency segments based on the patient inputs, or mute the decibel level for one or more of the plurality of frequency segments based on the patient inputs, for example.

Also, by way of example, these instructions facilitate the activation of specialized operational modes, such as directional sound focus, noise cancellation, and frequency amplification, allowing adjustments on a per-ear basis to suit different listening environments. Integration with a smart device is achieved through a wireless connection, enabled by the hearing aid's transceiver 150, which allows for real-time customization of settings via the smart device. This seamless interaction is made possible by a programming interface that supports the exchange of audiogram settings and control commands between the hearing aid and the smart device. This advanced communication empowers users to directly and effortlessly adjust their hearing aid settings, offering an unparalleled level of control and personalization. By enabling these functionalities, the hearing aid system evolves into a highly adaptable and user-centered device, capable of delivering a bespoke auditory experience that meets the unique needs of each individual.

Figure 4:
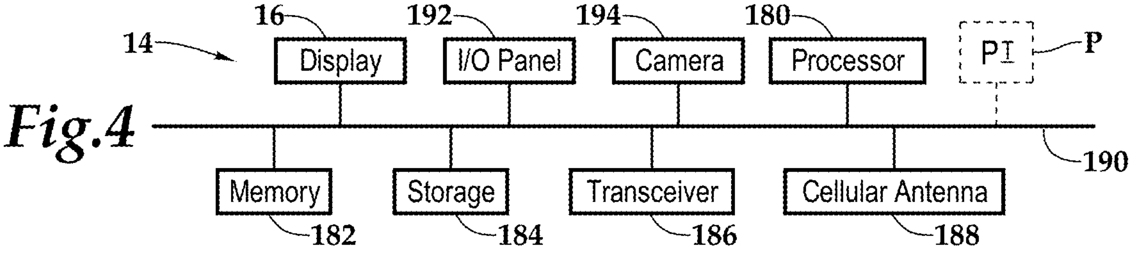
FIG. 4 is a functional block diagram depicting one embodiment of a smart device shown in FIG. 1, which may form a pairing with the hearing aid.

Referring now to FIG. 4, the proximate smart device 14 may be a wireless communication device of the type including various fixed, mobile, and/or portable devices. To expand rather than limit the discussion of the proximate smart device 14, such devices may include, but are not limited to, cellular or mobile smart phones, tablet computers, smartwatches, wearables, and so forth. The proximate smart device 14 may include a processor 180, memory 182, storage 184, a transceiver 186, and a cellular antenna 188 interconnected by a busing architecture 190 that also supports the display 16, I/O panel 192, and a camera 194. The programming interface P is associated with the processor 180 and possibly other components of the busing architecture 190. It should be appreciated that although a particular architecture is explained, other designs and layouts are within the teachings presented herein.

In operation, the teachings presented herein permit the proximate smart device 14 such as a smart phone to form a pairing with the hearing aid device 12 and operate the hearing aid device 12. As shown, the proximate smart device 14 includes the memory 182 accessible to the processor 180 and the memory 182 includes processor-executable instructions that, when executed, cause the processor 180 to provide an interface for an operator that includes an interactive application for viewing the status of the hearing aid device 12. The processor 180 is caused to present a menu for controlling the hearing aid device 12. The processor 180 is then caused to receive an interactive instruction from the user and forward a control signal via the transceiver 186, for example, to implement the instruction at the hearing aid device 12. The processor 180 may also be caused to generate various reports about the operation of the hearing aid device 12. The processor 180 may also be caused to translate or access a translation service for the audio.

In a further embodiment of processor-executable instructions, the processor-executable instructions cause the processor 180 to create a pairing via the transceiver 186 with the hearing aid device 12. Then, the processor-executable instructions may cause the processor 400 to transform through compression with distributed computing between the processor 180 and the hearing aid device 12, the digital signal into a processed digital signal having the qualified sound range, which includes the preferred hearing range as well as the subjective assessment of sound quality, as represented by the dynamically customizable audiogram. It should be appreciated, however, that in some embodiments the distributed computing is not necessary and all functionality may be with the hearing aid device 12. As previously discussed, the vivo adaptare audiogram may include multiple frequency segments that may be adjusted in terms of sound level or other characteristic. The vivo adaptare audiogram may include a range or ranges of sound corresponding to highest hearing capacity of an ear of a patient modified with a subjective assessment of sound quality according to the patient. The dynamically customizable audiogram may include a completed assessment of a degree of annoyance caused to the user by an impairment of wanted sound. The dynamically customizable audiogram according to the user may also include a completed assessment of a degree of pleasantness caused to the patient by an enablement of wanted sound. That is, the subjective assessment according to the user may include a completed assessment to determine best sound quality to the user.

Significantly, the processor-executable instructions extend beyond basic device operation, enabling users to actively participate in their auditory experience. Users can select operational modes, such as directional sound mode, amplification mode, and background noise reduction mode, tailored to their immediate environmental needs and hearing preferences. This functionality is emblematic of the system's dynamic architecture, where adjustments to the hearing aid's settings are not just reactionary but predictive and personalized, fostering an auditory environment that is both adaptive and immersive.

Moreover, the integration of distributed computing between the smart device 14 and the hearing aid device 12 facilitates the transformation of digital signals into a processed digital format, reflecting the nuanced preferences captured in the dynamically customizable audiogram. That is, the processor-executable instructions receive, through the user interface, patient inputs for adjusting the vivo adaptare audiogram that represents dynamically adjustable preferred hearing settings of the patient, including adjustments to one or more frequency segments. Each of the frequency segments are a divided portion of the dynamically customizable audiogram. The processor-executable instructions then process the patient inputs to adjust the dynamically customizable audiogram, thereby enabling adaptation to varying auditory environments as perceived by the patient. The processor-executable instructions then cause the transmission of the adjusted dynamically customizable audiogram to the hearing aid device for immediate application. This dynamically customizable audiogram, adjustable via the smart device, encapsulates a spectrum of auditory capabilities and preferences, including subjective assessments of sound quality. Such assessments enable the identification and enhancement of sounds, ensuring clarity and reducing discomfort, thereby exemplifying the system's commitment to providing a tailored and enriched auditory experience for users. Through this innovative approach, the hearing aid system 10 not only adapts to the auditory landscape but also reshapes it, making it conducive to the unique needs and preferences of the user, marking a paradigm shift in personalized hearing care.

Figure 5:
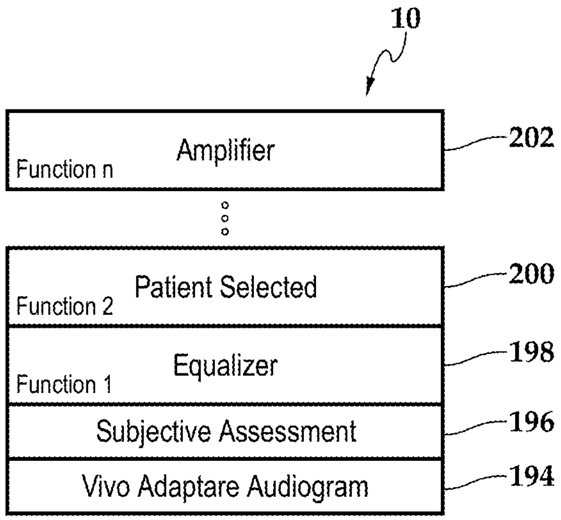
FIG. 5 is a functional block diagram depicting one embodiment of a system for aiding hearing according to the teachings presented herein.

FIG. 5 illustrates a comprehensive embodiment of the hearing aid system 10, showcasing a structured arrangement of its core components in ascending order to enhance user auditory experience. At the foundation of this system is the vivo adaptare audiogram module 194, an element that enables the hearing aid to perform real-time hearing assessments directly within the user's ear. This module is designed to dynamically generate and adjust audiograms based on the immediate acoustic environment, thereby allowing for personalized hearing aid calibration without the need for external audiometric testing.

Positioned above the vivo adaptare audiogram module is the subjective assessment module 196. This module integrates the user's personal preferences and perceptions of sound quality into the hearing aid's processing algorithms. By assessing and incorporating feedback on sound clarity, volume, and tone, the subjective assessment module ensures that the audio output is finely tuned to the user's specific auditory preferences, enhancing the overall satisfaction with the hearing aid's performance. Further enhancing the system's functionality are several function modules, labeled 198, 200, and 202, each designed to perform distinct sound processing tasks. Function module 198 serves as an advanced equalizer, offering precise control over frequency response to shape the audio signal according to the user's customized audiogram and subjective preferences. This allows for the attenuation or amplification of one or more specific frequency segments, ensuring that the sound delivered to the user is both clear and comfortable. Adjacent to the equalizer, additional function modules (200) provide various specialized processing capabilities, such as noise reduction, feedback suppression, frequency transition, dead zone analysis, and spatial awareness, further refining the sound quality and intelligibility for the user. The series culminates with function module 202, acting as a sophisticated amplifier. This module is responsible for adjusting the overall volume of the audio signal to the optimal listening level as determined by the vivo adaptare audiogram, subjective assessments, and user-controlled settings. The amplifier ensures that the sound is delivered at a consistent, comfortable level, accommodating for both the quiet and loud acoustic environments the user may encounter. Together, these modules within system 10 depict a holistic approach to hearing aid design, emphasizing personalization, adaptability, and user control. By integrating these advanced modules, the system offers tailored auditory experience, significantly surpassing the capabilities of traditional hearing aids.

Figure 6:
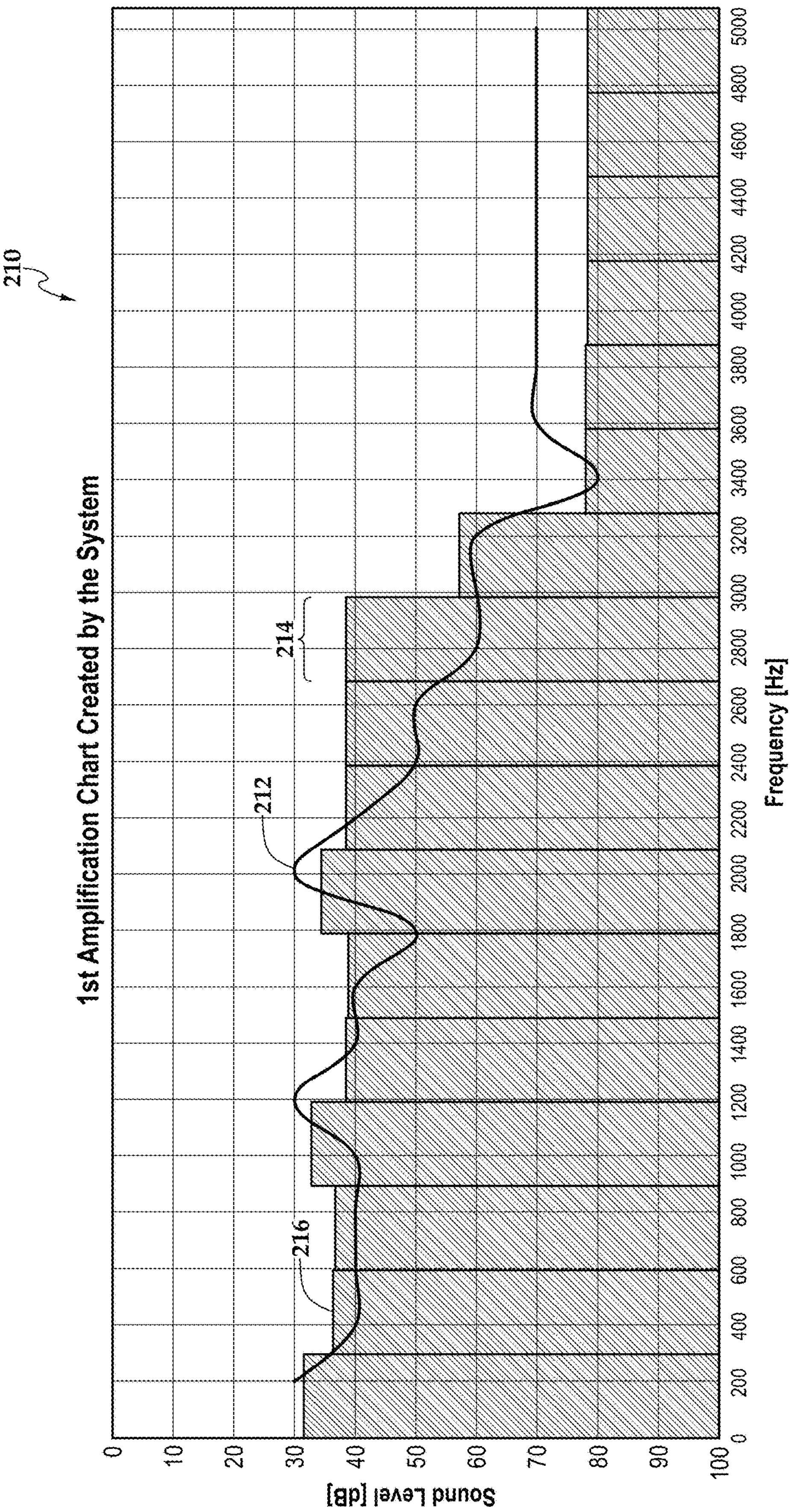
FIG. 6 is a first audiogram being utilized by the system presented herein.

Delving into FIG. 6, a dynamically customizable audiogram 210, which is the vivo adaptare audiogram, is depicted as the system's inaugural amplification chart, conceived through an initial auditory evaluation facilitated by both the hearing aid device 12 and the smart device 14. This foundational assessment leverages the resonant qualities of an organ sound, denoted by element 212, setting the stage for a deeply personalized auditory calibration process. The system extends an extensive suite of customization capabilities to users, delineated into a series of discrete frequency segments, exemplified by frequency segment 214. Each frequency segment encapsulates a distinct segment of the user's auditory spectrum, offering flexibility to fine-tune sound equalization with unprecedented granularity. This innovative approach allows users to sculpt their sound environment with precision, amplifying desired frequencies while attenuating or silencing others according to personal preference. The array of frequency segments spans a selection range from 100 to 500 Hz, with intermediary ranges like 200 to 400 Hz, and 250 to 350 Hz, although, in this specific illustration, a uniform increment of 300 Hz is adopted for each frequency segment. It should be appreciated, however, that each of the frequency segments is an adjustable frequency increment with its frequency range adjustable. Accompanying this, the original testing sound level at 216 is also depicted, laying the groundwork for subsequent auditory enhancements.

Figure 7:
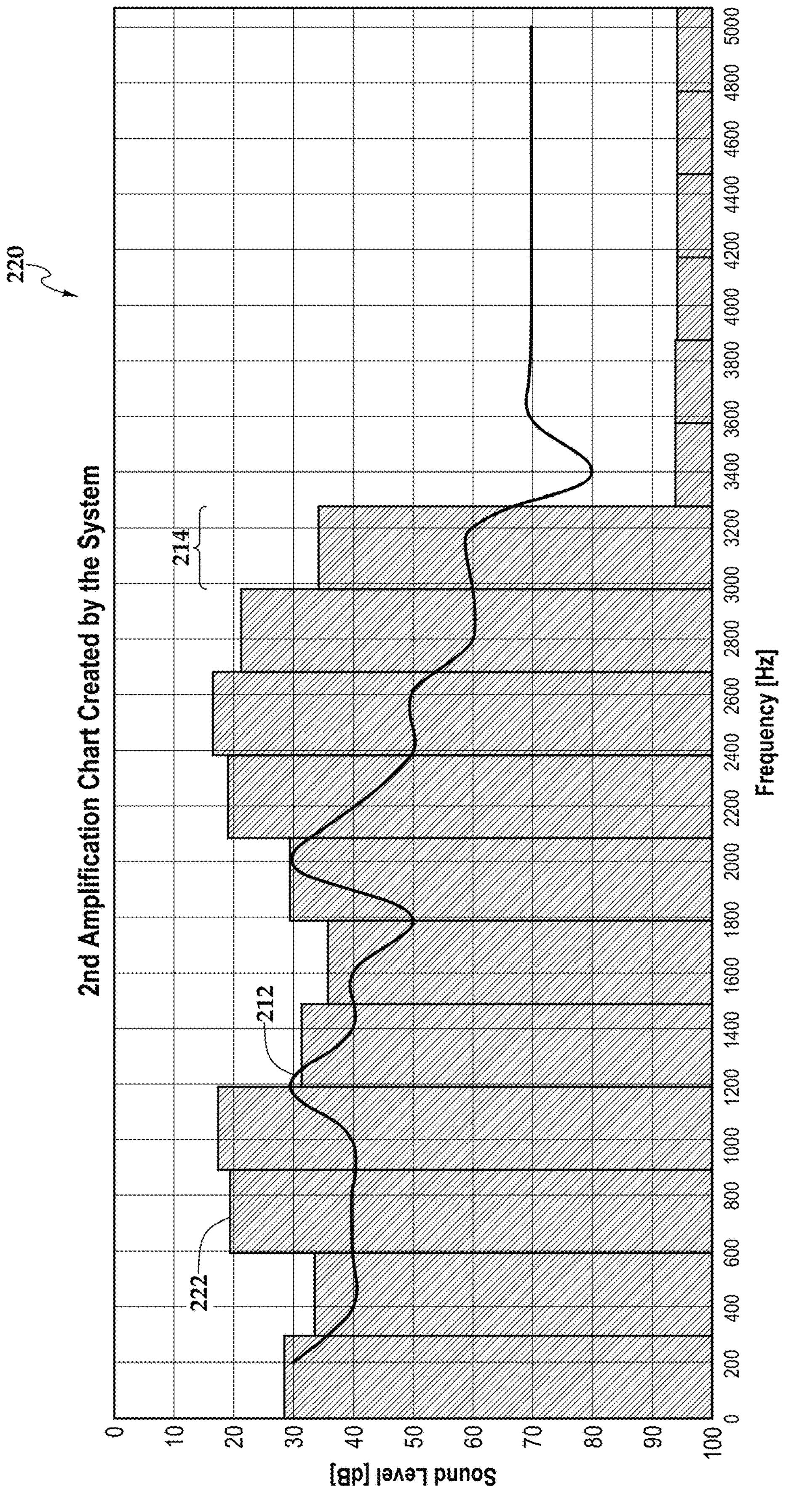
FIG. 7 is a second audiogram being utilized by the system presented herein.
Figure 8:
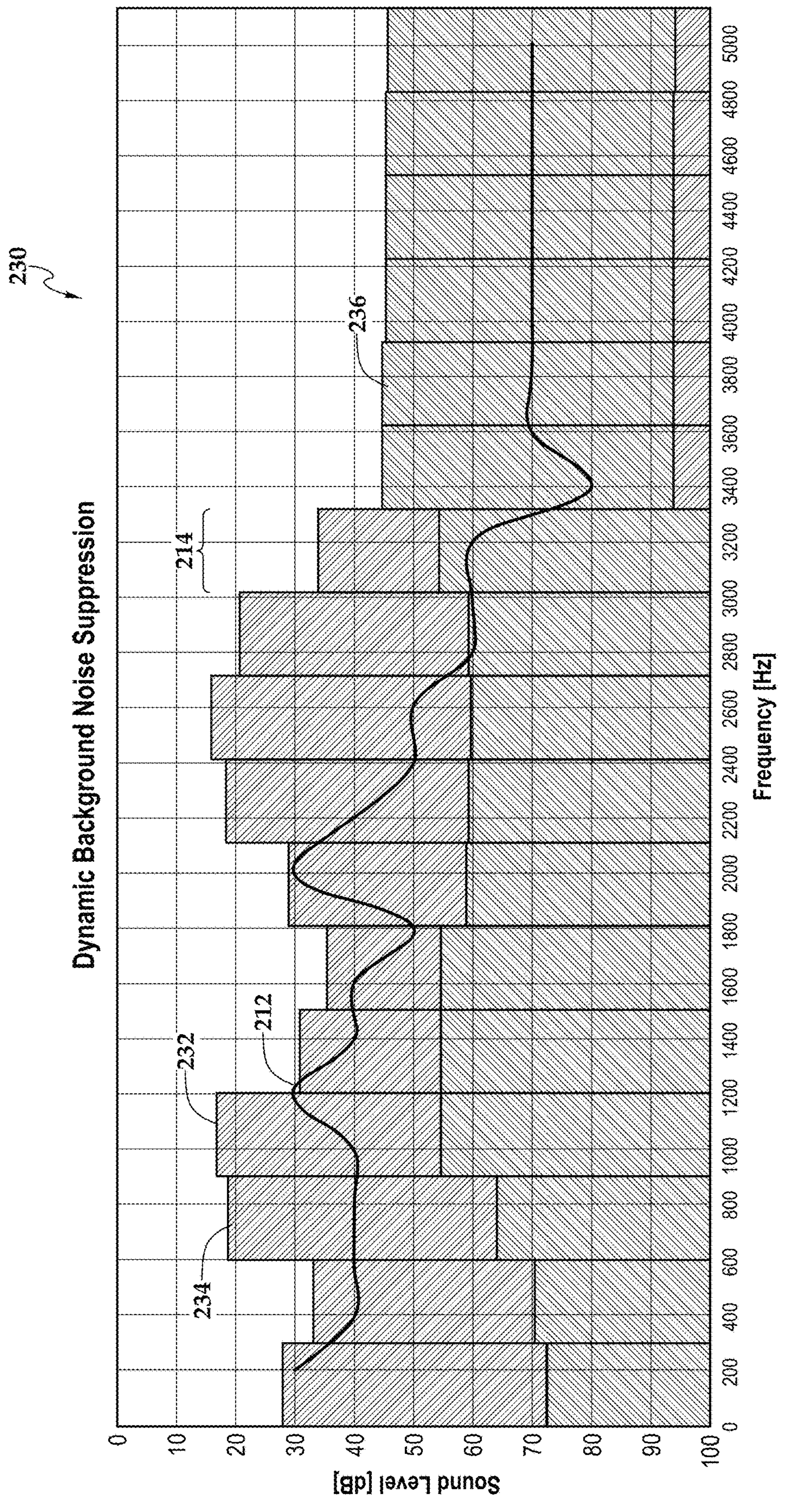
FIG. 8 is a third audiogram being utilized by the system presented herein.

Transitioning to FIG. 7, the evolution of the audiogram into a second amplification chart 220 is observed, wherein the sound level 222 has been adeptly adjusted by the user, employing dynamic interventions to refine their hearing experience. This progression signifies the active role of users in shaping their auditory perception, responding to real-time listening environments and personal hearing needs. Further exploration in FIG. 8 reveals another iteration of the vivo adaptare audiogram, designated as 230, where the sound level 232 emerges, infused with the dual benefits of amplification 234 and dynamic background noise suppression 236. This configuration underscores the system's capacity to adapt and respond to complex auditory environments, offering nuanced control over the hearing landscape.

Figure 9:
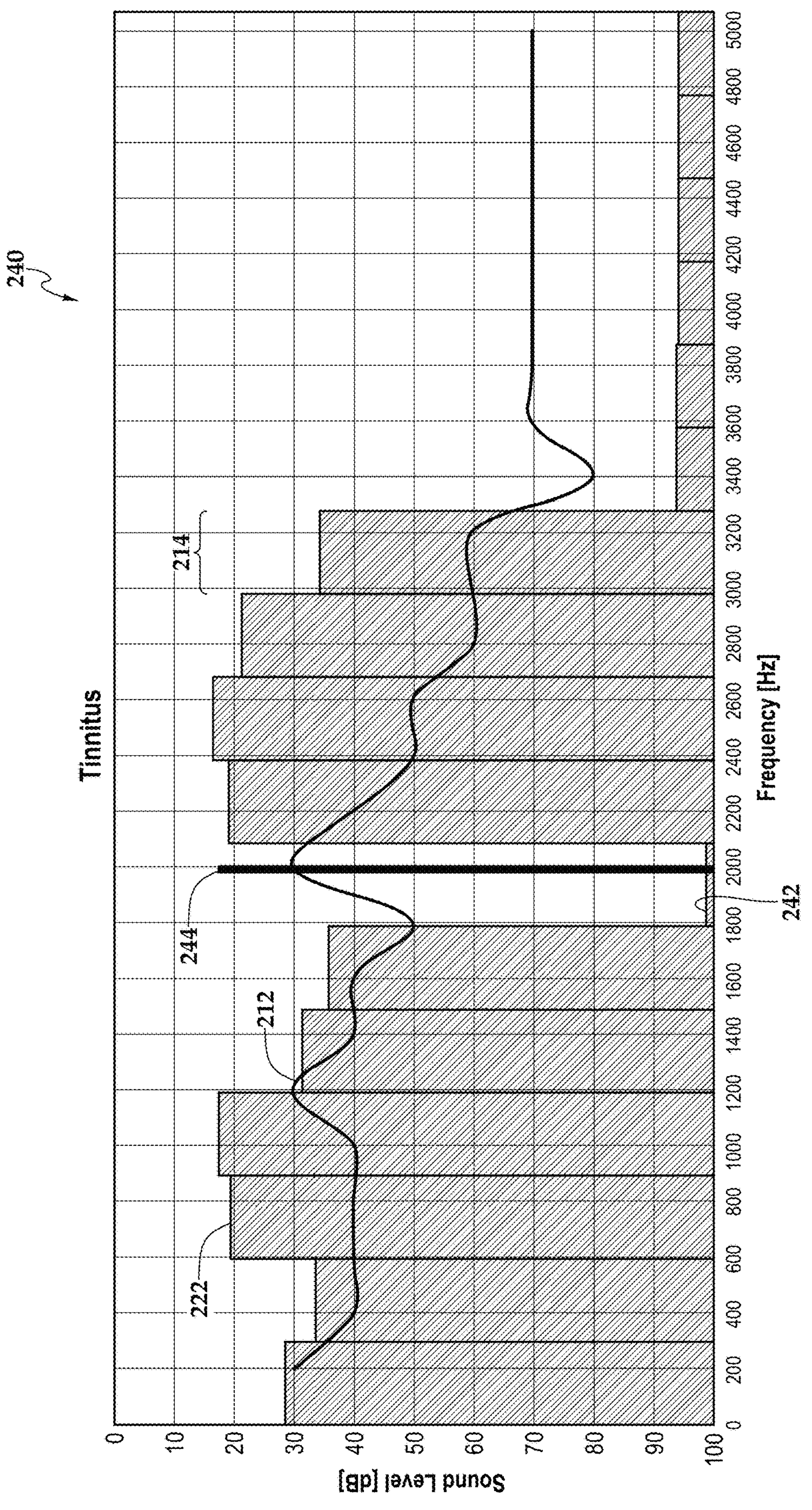
FIG. 9 is a fourth audiogram being utilized by the system presented herein.

In an illustrative leap to FIG. 9, the audiogram 240 showcases an advanced modification of sound level 242, where selective sound suppression is strategically applied to navigate around the challenges of tinnitus, resulting in a tailored sound output 244. This adaptation illustrates the system's sensitivity to user-specific auditory conditions, highlighting its ability to not only enhance general hearing experiences but also to provide comfort and relief in scenarios dominated by tinnitus. Through these sequential refinements captured across FIGS. 6 to 9, the system's prowess in delivering a highly customized, user-centric auditory enhancement journey is vividly demonstrated, blending sophisticated technology with the nuanced demands of individual hearing profiles.

Figure 10:
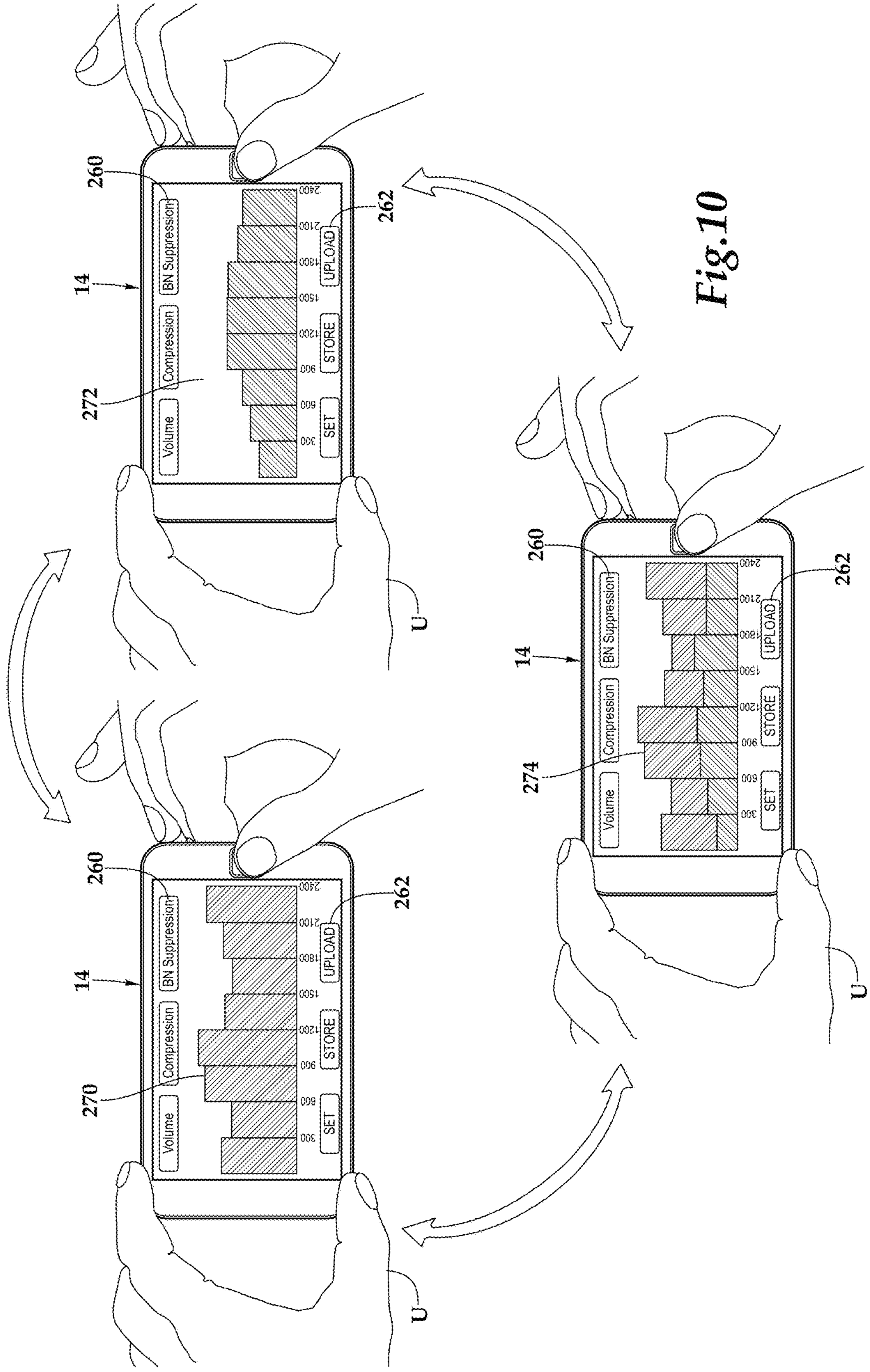
FIG. 10 is a modal diagram depicting different operational modes of the system presented herein.

Turning attention to FIG. 10, an expansive view into the user interfaces presented on the smart device 14 is offered, revealing a sophisticated and intuitive platform for user interaction and auditory customization. Within this interface, a variety of controls are laid out, thoughtfully designed to cater to the nuanced needs of the user in managing their auditory experience. Specifically, the interface is segmented into several control groups, each with its designated function and utility. The first set of controls, identified as controls 260, encompasses a trio of fundamental auditory adjustments: volume, compression, and background noise suppression. Each control is engineered to offer precise manipulation over the hearing aid's output, allowing users to fine-tune the auditory input to match their personal preferences and environmental requirements. Volume control provides users with the capability to adjust the loudness of the sound, ensuring that audio is neither too faint nor overwhelmingly loud. Compression controls offer a way to manage the dynamic range of sounds, making softer sounds more audible without increasing the volume of louder sounds, thus preserving auditory comfort. Background noise suppression controls are designed to minimize distracting ambient sounds, enabling users to focus on the primary audio source, whether it be a conversation, music, or other sounds of interest.

Expanding upon the customization options, Controls 262 introduce the user to the capability of setting, storing, and uploading changes to a series of dynamically customizable audiograms, labeled as 270, 272, and 274. These audiograms represent specific auditory profiles tailored to different listening environments and preferences. The dynamically customizable audiogram 270 illustrates an adjustment in volume, allowing users to modify the overall loudness of the hearing aid output to achieve the desired auditory balance. The dynamically customizable audiogram 272 is dedicated to background noise suppression, enabling users to create a hearing profile that effectively reduces ambient noise, thus enhancing the clarity and intelligibility of foreground sounds. Lastly, the dynamically customizable audiogram 274 focuses on compression adjustments, providing users the ability to set a hearing profile that optimizes the dynamic range of sounds, ensuring that all sounds, regardless of their original volume, are heard comfortably and clearly.

These interfaces and controls underscore the smart device's commitment to delivering a highly personalized and adaptable hearing aid experience. By empowering users with the ability to precisely adjust and save multiple audiogram settings, the system acknowledges the dynamic nature of human hearing and the diverse auditory environments encountered in daily life. This approach not only enhances the user's autonomy over their hearing experience but also fosters a sense of engagement and satisfaction with the hearing aid system, marking a significant advancement in the integration of technology and personalized care in the realm of auditory assistance.

Figure 11:
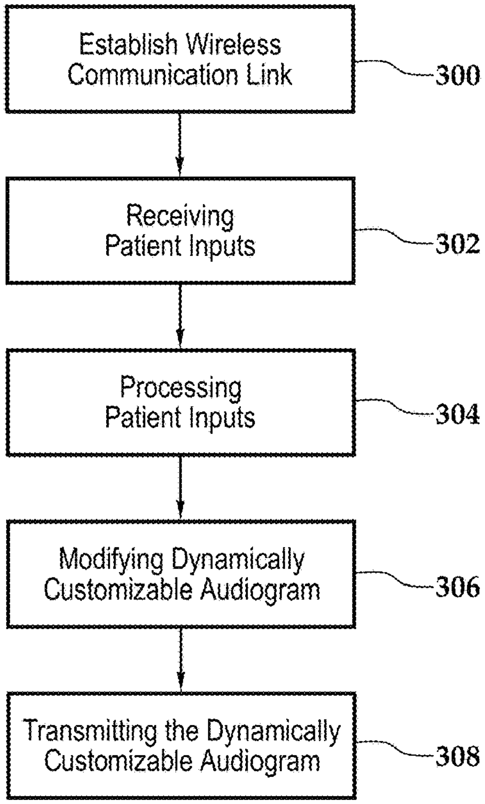
FIG. 11 is a flow chart depicting one embodiment of a method for aiding hearing being utilized according to the teachings presented herein.

Referring now to FIG. 11, in one embodiment of a methodology, at block 300, establishing a wireless communication link is established between a hearing aid device and a smart device via a transceiver. At block 302, a user interface of the smart device receives patient inputs for adjusting a dynamically customizable audiogram or vivo adaptare audiogram that represents preferred hearing settings of the patient. The adjustments may include modifications to one or more of the frequency segments within the audiogram. As previously discussed, each frequency segment represents a divided portion of the hearing range. At block 304, the patient inputs are processed and at block 306, the dynamically customizable audiogram is modified in accordance with the processing, thereby allowing for adaptation to varying auditory environments as perceived by the patient. At block 308, the vivo adaptare audiogram is transmitted from the smart device to the hearing aid device for immediate implementation in sound signal processing.

Figure 12:
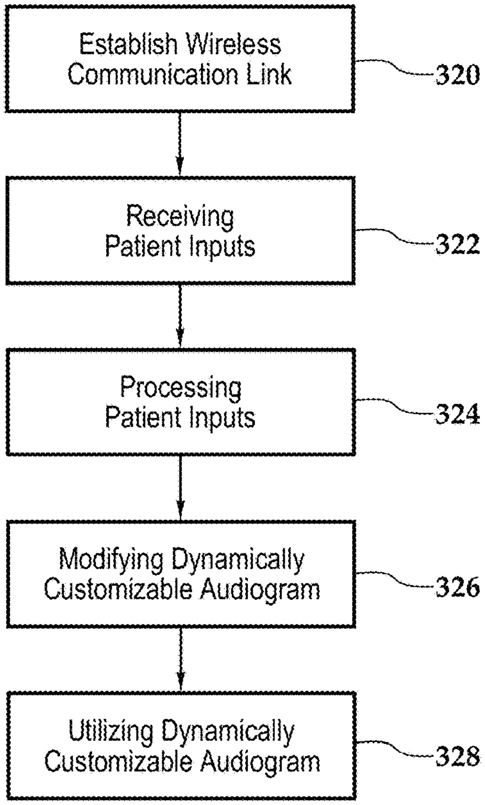
FIG. 12 is a flow chart depicting another embodiment of a method for aiding hearing being utilized according to the teachings presented herein.

Referring now to FIG. 12, in one embodiment of the methodology tailored for this advanced hearing aid invention, the process unfolds as follows. At block 320, a seamless wireless communication link is established between the hearing aid device and a smart device via a transceiver. This connection enables the exchange of data and control commands necessary for the dynamic customization and operation of the hearing aid. At block 322, the smart device's user interface collects patient inputs for real-time adjustments to the vivo adaptare audiogram. These adjustments are intricately designed to modify specific frequency segments within the audiogram, where each segment pertains to a distinct portion of the hearing range, allowing for granular control over the hearing experience.

Proceeding to block 324, the smart device processes the patient inputs. This step involves analyzing the adjustments to ensure they align with the user's hearing preferences and the acoustic characteristics of the current environment. At block 326, the audiogram within the hearing aid is dynamically updated to reflect the processed adjustments. This crucial step enables the hearing aid to adapt its audio processing in real-time to suit the varying auditory environments experienced by the user, ensuring an optimal listening experience under diverse conditions. Finally, at block 328, the updated, customized audiogram is utilized.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A hearing aid system for a patient, the hearing aid system comprising:

a programming interface configured to facilitate bidirectional communication between a hearing aid device and a smart device, the hearing aid device having integrated sound processing capabilities, including a microphone, a speaker, and an electronic signal processor capable of receiving, processing, and outputting audio signals, the smart device including a housing securing a processor, non-transitory memory, a user interface, a transceiver and storage therein, the smart device including a busing architecture communicatively interconnecting the speaker, the user interface, the processor, the transceiver, the memory, and the storage;

a vivo adaptare audiogram stored within the hearing aid device, the vivo adaptare audiogram being an integrated, dynamically customizable audiogram, the vivo adaptare audiogram having a plurality of frequency segments, each of the plurality of frequency segments being a divided portion of the vivo adaptare audiogram; and the non-transitory memory accessible to the processor, the non-transitory memory including processor-executable instructions that, when executed, by the processor cause the system to:

receive, through the user interface, patient inputs for adjusting a decibel level of a portion of the plurality of frequency segments, and process the patient inputs to adjust the vivo adaptare audiogram, thereby enabling adaptation to varying auditory environments as perceived by the patient.

2. The hearing aid system as recited in claim 1, wherein the processor-executable instructions further comprise instructions that, when executed, by the processor cause the system to:

facilitate on-demand auditory testing through the smart device, allowing the patient to continuously refine the vivo adaptare audiogram based on self-assessed hearing capabilities and environmental conditions, further enhancing the personalized hearing aid device performance.

3. The hearing aid system as recited in claim 1, wherein each of the plurality of frequency segments is an increment selected from the group consisting of 100 to 500 Hz, 200 to 400 Hz, and 250 to 350 Hz.

4. The hearing aid system as recited in claim 1, wherein each of the plurality of frequency segments is an adjustable frequency increment.

5. The hearing aid system as recited in claim 1, wherein the portion of the plurality of frequency segments further comprises one frequency segment.

6. The hearing aid system as recited in claim 1, wherein the portion of the plurality of frequency segments further comprises a plurality of frequency segments.

7. The hearing aid system as recited in claim 1, wherein the processor-executable instructions to process the patient inputs to adjust the vivo adaptare audiogram further comprise instructions that, when executed, by the processor cause the system to:

increase a decibel level for the portion of the plurality of frequency segments.

8. The hearing aid system as recited in claim 1, wherein the processor-executable instructions to process the patient inputs to adjust the vivo adaptare audiogram further comprise instructions that, when executed, by the processor cause the system to:

decrease a decibel level for the portion of the plurality of frequency segments.

9. The hearing aid system as recited in claim 1, wherein the processor-executable instructions to process the patient inputs to adjust the vivo adaptare audiogram further comprise instructions that, when executed, by the processor cause the system to:

mute a decibel level for the portion of the plurality of frequency segments.

10. The hearing aid system as recited in claim 1, wherein the smart device comprises a device selected from the group consisting of smartphones, tablet computers, smartwatches, and wearable devices.

11. The hearing aid system as recited in claim 1, wherein the hearing aid device is selected from the group consisting of hearing aids, earbuds, and headphones.

12. The hearing aid system as recited in claim 1, wherein the hearing aid device and the smart device are at least partially integrated.

13. An audiogram for use in a hearing aid system, the audiogram comprising:

a plurality of frequency segments, each segment representing a distinct portion of the frequency spectrum and corresponding to a specific frequency range;

a dynamically customizable configuration, wherein each of the plurality of frequency segments can be independently adjusted in decibel levels based on user inputs provided by a patient;

a graphical representation with sound level in decibels (dB) on the y-axis and frequency in Hertz (Hz) on the x-axis; and an interface enabling the patient to adjust the decibel levels of one or more of the plurality of frequency segments in real time, allowing for adaptive customization to accommodate varying auditory environments and personal hearing preferences.

14. A method for dynamically adjusting a hearing aid system for a patient, the method comprising:

establishing bidirectional communication between a hearing aid device and a smart device via a programming interface, wherein the hearing aid device includes integrated sound processing capabilities, a microphone, a speaker, and an electronic signal processor, and the smart device includes a processor, non-transitory memory, a user interface, a transceiver, and storage therein;

storing a vivo adaptare audiogram within the hearing aid device, the vivo adaptare audiogram being an integrated, dynamically customizable audiogram with a plurality of frequency segments, each segment representing a distinct portion of the vivo adaptare audiogram;

receiving, through the user interface, patient inputs for adjusting a decibel level of one or more of the plurality of frequency segments; and processing the patient inputs to adjust the vivo adaptare audiogram, thereby enabling adaptation to varying auditory environments as perceived by the patient.

15. The method as recited in claim 14, further comprising:

facilitating on-demand auditory testing through the smart device, allowing the patient to continuously refine the vivo adaptare audiogram based on self-assessed hearing capabilities and environmental conditions, thereby enhancing the personalized performance of the hearing aid device.

16. The method as recited in claim 14, wherein each of the plurality of frequency segments is an increment selected from the group consisting of 100 to 500 Hz, 200 to 400 Hz, and 250 to 350 Hz.

17. The method as recited in claim 14, wherein each of the plurality of frequency segments is an adjustable frequency increment.

18. The method as recited in claim 14, wherein the adjustment of the decibel level further comprises adjusting one frequency segment.

19. The method as recited in claim 14, wherein the adjustment of the decibel level further comprises adjusting the plurality of frequency segments.

20. The method as recited in claim 14, further comprising at least one of:

increasing the decibel level for one or more of the plurality of frequency segments based on the patient inputs;

decreasing the decibel level for one or more of the plurality of frequency segments based on the patient inputs; and muting the decibel level for one or more of the plurality of frequency segments based on the patient inputs.

* * * * *